May 14, 1929.　　　R. V. POLEN　　　1,712,839
LUBRICATING SYSTEM FOR MOTOR VEHICLES
Filed Oct. 25, 1922　　2 Sheets-Sheet 1
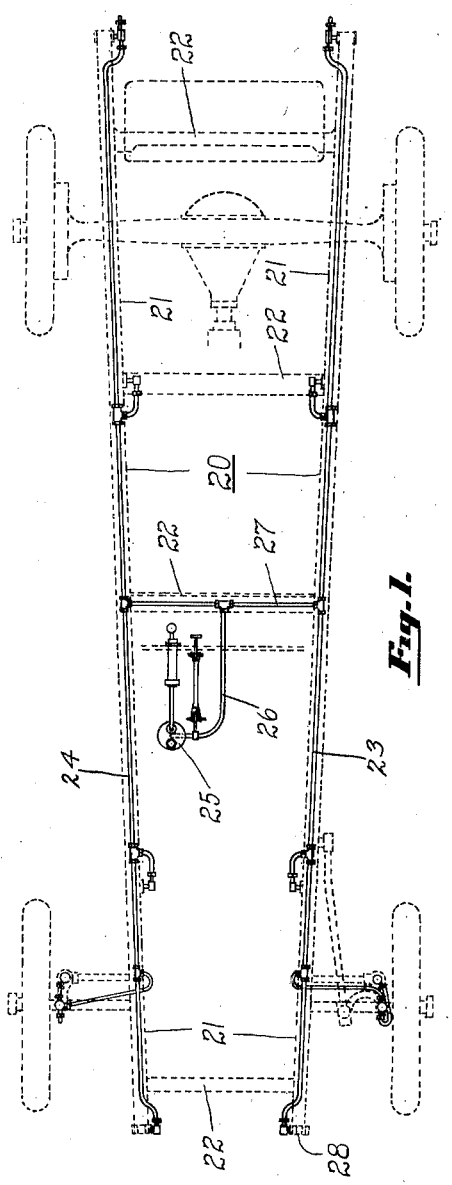
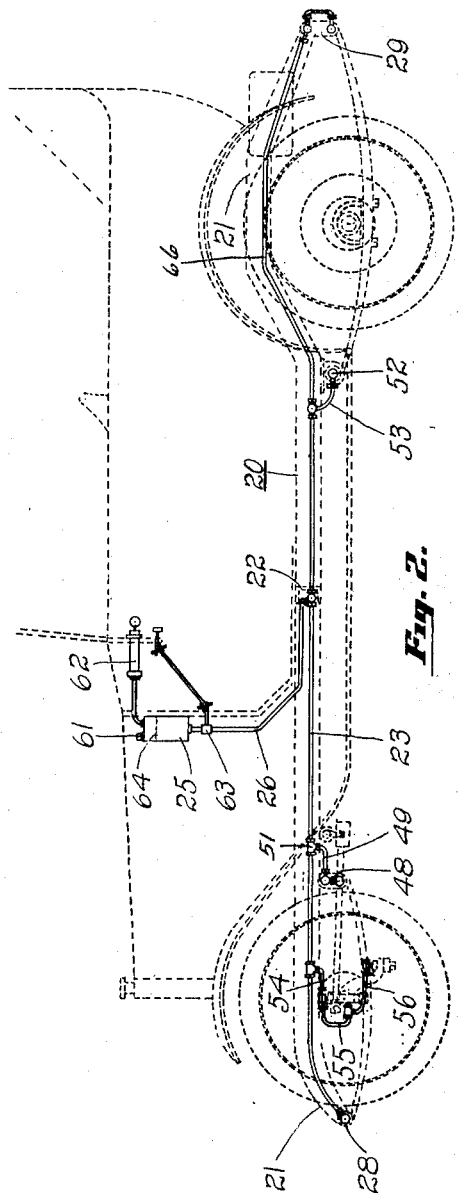
Inventor
Russell V Polen
By
His Attorney May 14, 1929.  R. V. POLEN  1,712,839
LUBRICATING SYSTEM FOR MOTOR VEHICLES
Filed Oct. 25, 1922  2 Sheets-Sheet 2
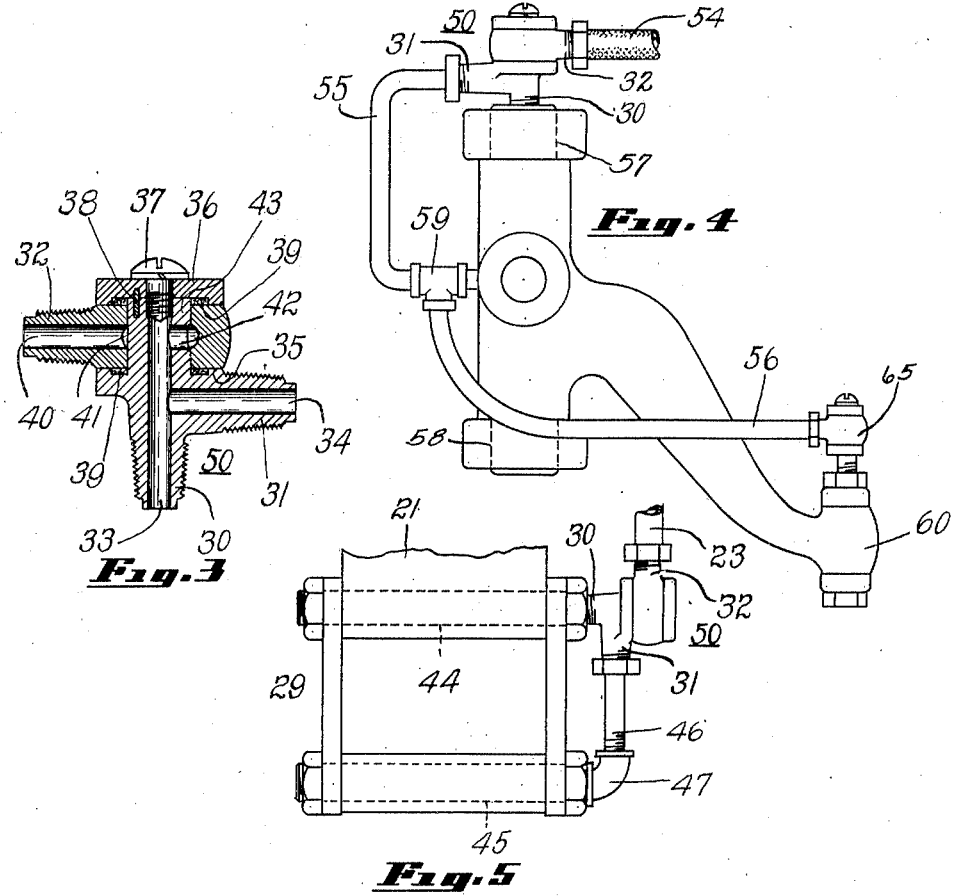
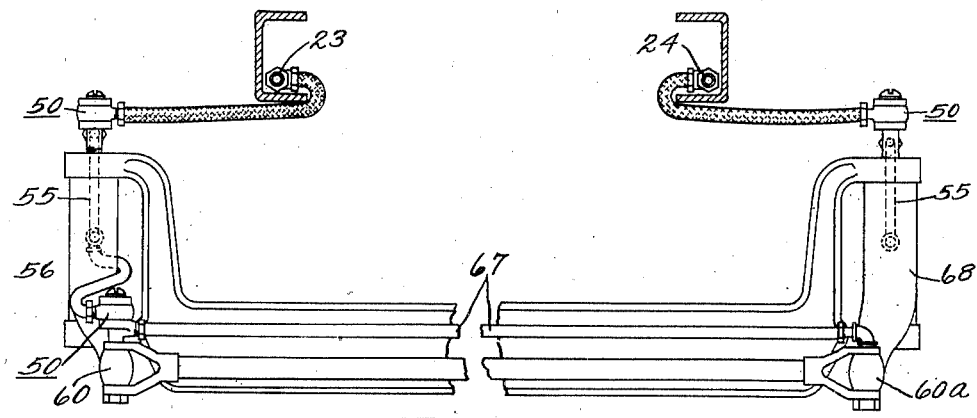
Inventor
Russell V Polen Patented May 14, 1929.

1,712,839

UNITED STATES PATENT OFFICE.

RUSSELL V. POLEN, OF DAYTON, OHIO.

LUBRICATING SYSTEM FOR MOTOR VEHICLES.

Application filed October 25, 1922. Serial No. 596,869.

This invention relates to lubricating systems for motor vehicles and more particularly to a system for lubricating the springs, spring shackle bolts, steering connections and like bearings, other than those of the engine, which are now commonly lubricated by means of grease cups or equivalent devices requiring the personal attention of an attendant at each bearing.

An object of this invention is to provide a lubricating system in which the various bearings may be lubricated simultaneously from a central lubricant reservoir.

A further object is to provide a lubricating system which may be controlled from the driver's seat.

Other and further objects will appear from the following description, reference being had to the accompanying drawings in which preferred embodiments of the present invention are clearly shown.

In the drawings:

Figs. 1 and 2 are plan and elevational views, respectively, of the present invention, the outlines of a motor vehicle being indicated in dotted lines to illustrate the application of the present lubricating system thereto;

Fig. 3 is a longitudinal section of a special T fitting used in the present invention;

Figs. 4 and 5 are detail elevational views of bearings showing the connections for lubricating special bearings; and Fig. 6 shows a modified form of connections used for lubricating the tie rod.

Referring to the drawings, in which like parts are indicated by like reference characters in the several figures, 20 designates the chassis frame as a whole which as herein shown consists of side frames 21 extending lengthwise of the motor vehicle and the cross members 22 of any suitable construction rigidly secured to the side frames for holding the same in spaced relation to one another. The side frames 21 are commonly formed of channel iron with the channels opening inwardly, but it will be understood that any other desired form or construction of side frame may be employed.

In the preferred embodiment of the invention, as shown in Figs. 1 and 2, main distributing pipes 23 and 24 are laid along the left-hand and the right-hand side frames respectively of the chassis, and are provided with suitable connections to the bearings to be lubricated whereby each distributing pipe will supply lubricant to the bearings on its side of the vehicle as will be explained in greater detail hereinafter. The distributing pipes receive lubricant from a reservoir 25 with which they are connected by feed pipes 26 and 27, the latter of which extends transversely of the vehicle and connects the main distributing pipes together, as best shown in Fig. 1. The distributing pipes 23 and 24 are preferably laid in the channels of the channel iron side frames, and are secured thereto at intervals by means of suitable clips fastened to the side frames, and the feed pipe 27 is similarly laid in the channel of a cross member 22.

The distributing pipes 23 and 24 are connected to the various bearings to be lubricated by means of suitable connections which are either rigid or flexible according as the bearings are fixed or movable with respect to the chassis frame. Thus, the front end of the distributing pipe is bent out of the channel of the side frame and rigidly connected by means of a suitable elbow with the front bolt 28 of the front spring, and the rear end of the distributing pipe is likewise bent out and connected with the spring shackle 29 at the rear of the rear spring, but in the latter case special connections are used as shown in Fig. 5.

Fig. 3 shows a special fitting which is used wherever a swinging connection is required between two of the lubricating pipes, as for example in the special connection illustrated in Fig. 5. Referring now to Fig. 3, the special fitting consists of a T 50 having a central stem 30, a fixed arm 31, and a swinging arm 32 adapted to swing about the stud 43. The stem and stud of the T are integral and are provided with a central oil passage 33 which communicates at one side with passage 34 of the fixed arm 31. The swinging arm 32 is provided with a bore adapted to receive the stud 43 and is held for swinging movement thereon by shoulder 35 and washer 36. The washer 36 is secured in position by screw 37 threaded into one end of passage 33, and is held against rotation by means of a pin 38. Packings 39 are provided in the shoulder 35 and washer 36 to prevent leakage of oil around the swinging arm. To establish communication between the oil passage 33 of the central stem and oil passage 40 of the swinging arm, the bore of the swinging arm is provided with an annular groove 41 which connects with oil passage 40 and faces the radial oil passage 42 formed in the stud 43. It will be seen that as the arm 32 swings or revolves about the stud 43 in a horizontal plane, as shown in Fig. 3, there will always be communication between the radial passage 42 and the annular groove 41 formed in the swinging arm.

Fig. 5 shows the oiling connections for the spring shackle 29 already referred to. Lubricant enters through the distributing pipe 23, which is connected with the swinging arm 32 of T 50 and passes to the upper bolt 44 by the stem 30 and to the lower bolt 45 by the fixed arm 31, pipe 46 and elbow 47, as will be readily understood.

Similar oiling connections are provided for the shackle 48 at the rear end of the front spring, the swinging arm being connected with the main distributing pipe 23 by means of a short section of pipe 49 and a standard T 51.

Oil for the front bolt 52 of the rear spring is supplied by means of a short pipe 53 connected to the bolt by an elbow and to the distributing pipe by a standard T.

The steering spindle bolt and the steering knuckle receive oil from the distributing pipe through a flexible tube 54 and rigid pipes 55 and 56. Referring to Fig. 4, which is an enlarged detail view, it will be seen that oil entering the T 50 through the swinging arm 32 lubricates the upper bearing 57 of the steering spindle bolt through the stem 30 and the lower bearing 58 of the steering spindle bolt through the fixed arm 31 and pipe 55. A standard T 59 takes off oil from the pipe 55 through the pipe 56 to the steering knuckle 60 which is provided with an elbow 65 having a swinging arm of a construction similar to the T 50.

Referring now to Fig. 1, the lubricant reservoir 25 is carried under the hood of the motor vehicle and preferably is mounted as high as possible for reasons which will appear hereinafter. The reservoir is provided with a filler plug 61 through which lubricant may be introduced, and also a pump 62 for pumping air into the reservoir under pressure. A valve 63 in the feed pipe 26 admits the lubricant to the system as desired. It will be observed that both the pump 62 and the valve 63 may be operated from the driver's seat.

The operation of the present invention is as follows: The reservoir 25 is filled with an oil which flows readily to say the level 64 and, the valve 63 being closed, air is pumped into the reservoir by means of the pump 62 or by any other desired method until there is a substantial pressure in the reservoir. The valve 63 is then opened to permit the oil to flow under pressure through the feed pipes 26 and 27 to the main distributing pipes 23 and 24, to the various bearings connected with the distributing pipes. When the bearings are thoroughly lubricated the valve 63 is closed leaving the feed pipes and distributing pipes full of oil which flows to the bearings by gravity and keeps them lubricated for a considerable period of time. As shown in Fig. 2, the pipes to the various bearings are all arranged to drop downwardly from the distributing pipes 23 and 24 so as to facilitate this gravity feed, and the arrangement is such as to insure the flow of oil to all bearings. The main distributing pipes 23 and 24 are each bent upwardly at 66 with the side frames above the rear axle, and this bend divides the pipe into a short section sloping to the rear and a long section sloping to the front. It will be observed that the capacities of the long and the short sections are approximately proportional to the number of bearings to be oiled by them, which also is an advantage in that the various pipes tend to drain in approximately the same time.

As more oil is required, the valve 63 is reopened and oil permitted to flow to all the bearings under pressure. When oil begins to leak through the bearings, the valve is closed again and the oil thereafter flows to the bearings by gravity as already described. During the normal operation of the device a certain amount of oil leaks through the spring shackles and around the spring bolts but this oil is not lost, for it runs down the vehicle springs and keeps them lubricated.

Fig. 6 shows a modified form of connections for lubricating the steering knuckles 60 and 60$^a$ in which the knuckle 60$^a$ receives its oil through the pipe 67 which is connected to an arm of the fitting 50 on the knuckle 60, as shown. Knuckle 60$^a$ thus receives oil from the pipe 23 on the left side of the vehicle. The steering spindle bolt 68 on the right side of the vehicle is lubricated from the distributing pipe 24, as shown. This form of the invention has the advantage that it does away with a special fitting at the knuckle 60$^a$ and hence is more economical to construct than the form in which each knuckle is oiled from its own side of the vehicle.

It will be seen that the present invention provides a simple, effective and convenient means for lubricating the vehicle springs and the bearings which have generally been considered more or less inaccessible and bothersome, and which for that reason have most frequently been neglected.

While the forms of mechanisms herein shown and described constitute preferred embodiments of one form of the invention, it is to be understood that other forms might be adopted and various changes and alteration made in the shape, size, and proportion of the elements therein without departing from the spirit and scope of the invention.

What is claimed is as follows:

1. In a lubricating system, in combination, a vehicle having an axle member, a steering knuckle at each end of the axle, a tie rod member, bolts pivotally connecting the steering knuckles with the axle and the tie rod, means for supplying lubricant to one of said knuckles, said means including a conduit communicating with the bearings of both bolts of said last-mentioned knuckle, and a lubricant conduit communicating with said first conduit and extending along said tie rod to the bearing of a bolt on the other knuckle.

2. In a lubricating system, in combination, a vehicle having an axle member, a steering knuckle at each end of the axle, a tie rod member, bolts pivotally connecting the steering knuckles with the axle and the tie rod, means for supplying lubricant to one of said knuckles, said means including a conduit communicating with the bearings of both bolts of said last-mentioned knuckle, and a lubricant conduit lying along the tie rod and connecting the bearing of the tie rod bolt on one of the knuckles with the tie rod bolt bearing on the other knuckle.

3. A lubricating system for vehicles, comprising in combination, a vehicle having a vehicle frame and a transverse axle, a steering knuckle at each end of said axle, king bolts for pivotally connecting said knuckles with said axle, a tie rod, tie rod bolts for pivotally connecting the opposite ends of said tie rod with said steering knuckles, a source of lubricant including main lubricant distributing pipes mounted on the vehicle frame and extending longitudinally thereof one along each side frame of the vehicle, a lubricant supply conduit dropped from one of said main distributing pipes down to the knuckle on the same side of the vehicle for lubricating the king bolt and the tie rod bolt thereof, and a lubricant conduit lying along said tie rod to supply lubricant from said last-mentioned knuckle to the tie rod bolt of the opposite knuckle, and another lubricant supply pipe dropped from the other of said main lubricant distributing pipes to the king bolt of said opposite knuckle.

In testimony whereof I hereto affix my signature.

RUSSELL V. POLEN.